Feb. 21, 1928.
W. B. PAULSON
COUNTING SCALE
Filed Nov. 24, 1924
1,660,089
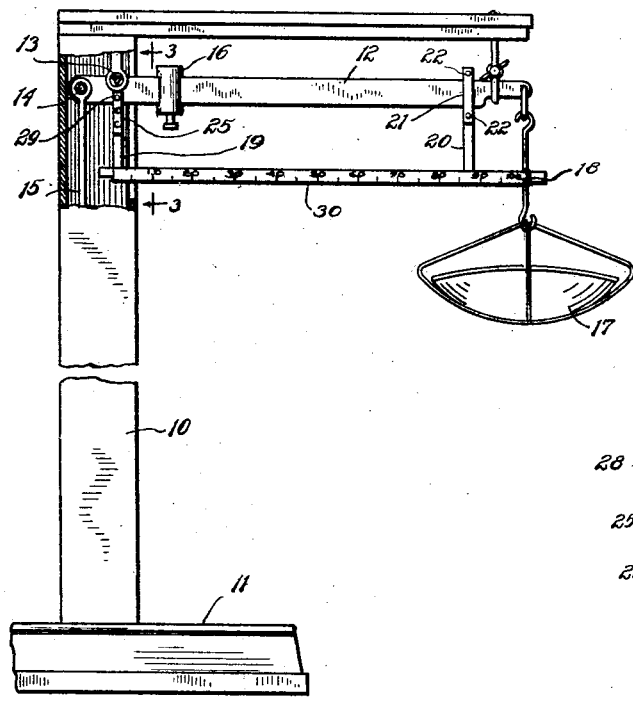
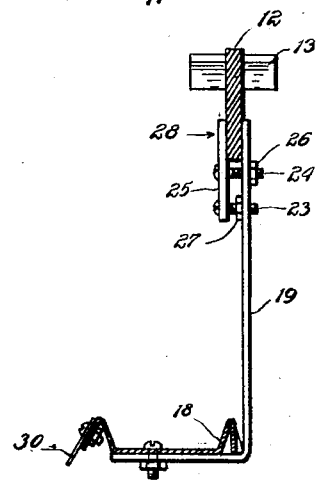
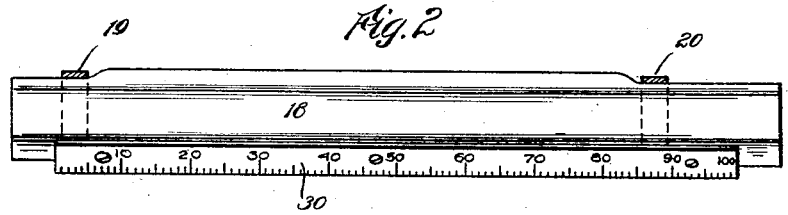
Inventor
William B. Paulson
By Casper L. Redfield
Atty Patented Feb. 21, 1928.

1,660,089

UNITED STATES PATENT OFFICE.

WILLIAM B. PAULSON, OF WILMETTE, ILLINOIS.

COUNTING SCALE.

Application filed November 24, 1924. Serial No. 751,726.

My invention relates to counting scales, and has for its object, improvements in such devices. I may make my improvement as part of the scale beam or lever, but I prefer to illustrate it herein as an attachment to scales already in use. The reason for this is that my invention is capable of being applied to any of the ordinary beam scales so as to make such weighing scale into a counting scale without detracting from the scale its full capacity as a weighing device.

In the accompanying drawings

Fig. 1 is a side elevation, partly in section, of an ordinary platform scale with my device attached to the scale beam;

Fig. 2 is an enlarged plan of the trough or channel which I connect to the scale beam; and Fig. 3 is a still more enlarged section on line 3—3 of Fig. 1, showing the means of connection adjacent to the beam pivot.

In said drawings, 10 is the standard, and 11 is the platform of an ordinary platform scale. The beam 12 is supported at the pivot 13, and is connected at pivot 14 by rod 15 to the platform 11. On the beam is the ordinary sliding poise 16. At the outer end of the beam the pendant poise is removed, and a pan 17 is substituted therefor. This pan is made lighter than the removed poise so that the weight of the pan plus the weight of the parts of my attachment will have the same effect upon the scale beam as that of the removed pendent poise.

My attachment consists of a channel 18 which is suspended from the beam 12 by bars 19 and 20. The connection to the beam for the bar 20 is by means of a strap 21 and screws 22 as shown in Fig. 1.

The connection for bar 19 is a little different as it is desired to have that connection directly below the pivot 13. The reason for this is that ordinarily there is not room for it between pivots 13 and 14, and if it should be placed to the right of pivot 13 it would interfere with the sliding poise 16. Ordinarily, it is desired not to cut the beam in any way when putting on the counting attachment for trial. This requires some clamping arrangement, and I have devised a simple clamp means suitable for this particular purpose.

In the bar 19, at about the positions shown in Fig. 3, are drilled holes for the free passage of screw 23 and bolt 24. A clamping plate or strip 25 is provided, and there is a free hole therein for the bolt 24. This hole is at about the middle of the length of the strip 25. Near one end of the strip is a threaded hole for the screw 23. There is a nut 26 on the outer end of bolt 24, and a nut 27 on screw 23 between the bar 19 and the strip 25.

The parts are placed on the beam 12 in about the position shown in Fig. 3, and the nut 26 is tightened to clamp the beam between the bar 19 and strip 25. The nut 27 is then turned to spread the parts 19 and 25 at this point. This results in moving strip 25 on bolt 24 as a fulcrum so as to put heavy clamping pressure on the beam to support the channel 18 at this point. If the trial is satisfactory to the prospective purchaser, a hole is usually drilled at the point 28 in Fig. 3 for the reception of a bolt or screw 29 shown in Fig. 1. This makes a permanent connection out of what was before a temporary one.

On the front edge of the channel 18 is a scale 30 of the same length as the distance between the pivot 13 and the point of suspension of the pan 17. In ordinary scales, this distance is usually related to the distance between pivots 13 and 14, and the lower connections to the platform 11, so that one pound at the end of the scale beam will balance one hundred pounds on the platform. Under such conditions the scale 30 is provided with one hundred graduations.

My device is applicable for counting large numbers of small articles of the same weight, such as screws, nuts or other objects. In using the device, an empty receptacle, such as a pan, box or keg, is placed on the platform, and this is balanced by moving the poise 16. The articles to be counted are then dumped into the receptacle.

From the receptacle, articles are taken by hand and dropped into the pan 17 until they just overbalance the remaining weight on the platform. If one of the articles is now removed from the pan, then the weight on the platform will overbalance the weight in the pan. If this removed article is now placed in the channel 18 and slid along, there will be found a point of exact balance.

When this is accomplished, each article in the pan will mean one hundred articles in the receptacle, and the graduation adjacent to the article in the channel will represent the fraction of the next hundred. For example, if there are 75 articles in the pan, and the article in the channel stands at graduation 60, then the total number of articles will be: 7500+60+75+1=7636. In this, the first two numbers represent the number of articles in the receptacle, the third number represents those in the pan, and the last number represents the article in the channel.

In counting scales as ordinarily made, the single or sample article which is to represent the fraction of a hundred in the receptacle on the platform, is supported in a movable carrier. When this sample article is moved along to count those fractions of a hundred, the carrier moves with it, and to compensate for the disturbance caused by shifting the weight of the carrier to different points on the beam, there is introduced a counterpoise which is connected to the carrier and moves an equal amount in the opposite direction.

My device is distinguished from such devices by the fact that my carrier is a stationary holder, and the sample article is the only thing moved when shifting its position on the holder.

As so arranged, the holder becomes a secondary beam graduated for fractions of a hundred of the number of articles to be counted, and a sample of the articles to be counted becomes a secondary sliding poise. The secondary beam and the secondary poise correspond to the beam 12 and poise 16 in that they are completely sufficient for the purpose without the introduction of a movable carrier to support the secondary poise. It will also be seen that the introduction of the secondary beam does not affect the use of the primary beam 12 and the primary poise 16 in weighing. Also, it will be seen that the secondary beam and secondary poise operate on the same principle as the primary beam and primary poise. In the claims I will use the term "sliding poise" to distinguish my construction from those constructions in which the secondary poise is supported and moved in a sliding or otherwise movable carrier.

The holder may be of any form that will extend over the distance thru which the sample article must be moved to get the proper balance, but I have shown it in the form of a channel 18 because such channel is a convenient holder for articles of the kind ordinarily counted. In using a stationary carrier along which an article may be shifted as the primary poise 16 is shifted, I simplify the device, and avoid moving parts which are liable to get out of order.

What I claim is:

1. The combination with the pivoted beam and sliding poise thereof, of a pan suspended at the free end of the beam and serving as the stationary poise of the scale, and a holder secured to the beam and having graduations from the pivot of the beam to the point of suspension of the pan, said holder serving as a support for a sample of articles to be counted by the scale.

2. The combination with a weighing scale having a pivoted beam, a sliding poise, and a pan suspended at the free end of the beam; of a counting scale consisting of a graduated holder secured to the beam and extending from the pivot of the beam to the point of suspension of the pan, said holder being arranged to support a sample of articles to be counted and such sample serving as a secondary sliding poise co-operating with the graduations of the holder.

3. The combination with a weighing scale having a pivoted beam, a sliding poise, and a pan; of a counting scale consisting of a secondary beam secured to the primary beam and extending from the pivot of the beam to the support of the pan, said secondary beam being arranged to support a sample of the articles to be counted so that such sample will serve as a secondary poise having the same relationship to the secondary beam that the primary poise has to the primary beam.

4. In a device of the class described, clamping means for securing a secondary beam to a primary beam in the device near the pivot of the primary beam, said clamping means consisting of a bar secured to the secondary beam and having its end engaging one side of the primary beam below the pivot thereof, a short strip lying parallel to said bar and having its upper end engaging the opposite side of the primary beam, a bolt connecting the bar and strip adjacent to the beam, and a screw at the lower end of the strip for moving it on the bolt as a fulcrum.

WILLIAM B. PAULSON.